United States Patent [19]

Lunder

[11] Patent Number: 5,417,460
[45] Date of Patent: May 23, 1995

[54] APPARATUS FOR MOUNTING A DRAIN HOSE TO AN RV WASTE REMOVAL VALVE ASSEMBLY

[75] Inventor: Dennis Lunder, Chula Vista, Calif.

[73] Assignee: Valterra Products, Inc., San Fernando, Calif.

[21] Appl. No.: 93,596

[22] Filed: Jul. 19, 1993

Related U.S. Application Data

[63] Continuation-in-part of Ser. No. 5,069, Jan. 15, 1993, abandoned.

[51] Int. Cl.⁶ ............................................. F16L 33/22
[52] U.S. Cl. .................................... 285/253; 285/903; 285/242
[58] Field of Search .................. 285/242, 252, 253, 23, 285/12, 903; 138/109; 137/899, 355.16

[56] References Cited

U.S. PATENT DOCUMENTS

| | | | |
|---|---|---|---|
| 3,760,430 | 9/1973 | Brenden | 285/177 |
| 4,133,347 | 1/1979 | Mercer | 285/299 |
| 4,152,014 | 5/1979 | Soeffker | 285/253 |
| 4,483,556 | 11/1984 | LiVolsi | 285/252 |
| 4,643,229 | 2/1987 | Hickin | 138/109 |
| 4,763,932 | 8/1988 | Matz et al. | 285/253 |
| 4,796,926 | 1/1989 | Rapsilver | 285/283 |
| 4,854,349 | 8/1989 | Foreman | 285/402 |
| 5,082,315 | 1/1992 | Sauer | 285/253 |
| 5,333,910 | 8/1994 | Bailey | 285/12 |

*Primary Examiner*—Eric K. Nicholson
*Attorney, Agent, or Firm*—Rapkin, Gitlin & Moser

[57] ABSTRACT

An apparatus for attaching and securing a drain hose to the adapter used with a recreational vehicle ("RV") waste drain assembly or, at the opposite end of the hose, to a sewer fitting used in conjunction with a septic tank or some other type of in or above ground sewer system for receiving drained waste matter. The apparatus comprises a retaining ring, which may include an annular flange formed along one edge, slidably mountable inside the opening at one end of a RV drain hose, for retaining the shape and requisite diameter dimension of the end section of the hose to facilitate its engagement with the adapter or the sewer fitting when those connections are made. The ring is removed before the adapter or the sewer fitting engages the hose opening to enable the hose to contract and form a tight seal with those components.

3 Claims, 5 Drawing Sheets

APPARATUS FOR MOUNTING A DRAIN HOSE TO AN RV WASTE REMOVAL VALVE ASSEMBLY

This is a continuation-in-part of application Ser. No. 005,069, filed Jan. 15, 1993, now abandoned.

BACKGROUND OF THE INVENTION

The present invention relates to the field of recreational vehicle waste disposal, and more particularly to an apparatus for securing a drain hose to a sewer fitting or an adapter for a waste removal valve assembly mounted beneath a recreational vehicle.

DESCRIPTION OF THE RELATED ART

Various types of adapters for use in conjunction with recreational vehicle ("RV") waste disposal assemblies are well known in the art. Common among these various devices are threaded valve hose adapters that self-thread onto an RV drain hose and serve as the coupling between the valve assembly and the hose. Another example is the non-threaded version of the same general type of adapter, which is also designed to engage the opening at either end of the drain hose, but naturally without the use of any threads.

The drawbacks associated with these prior art devices are numerous. The self-threading adapter, though effective to some degree, is extremely expensive to manufacture due primarily to the detail involved in producing the threads and the relatively initial high cost of fabricating the production mold. The use of the non-threaded or smooth surface type of adapter, though generally effective and much less expensive to manufacture, presents a different set of problems. Drain hoses are generally constructed of a resilient synthetic or plastic-like material, which has a tendency to significantly contract in the absence of some device that would prevent the contraction of the material from occurring. Thus, to enable the non-threaded type of adapter to properly slip into the end of a coiled drain hose, which is one of the most common varieties of drain hoses, and ensure a tight fit there, it is usually necessary to first stretch the hose at the opening to expand the coils. This is not always easy. The task is usually time consuming and often frustrating. Many recreational vehicle enthusiasts, however, desire an apparatus for attaching a drain hose to the adapter of a waste drain valve assembly which permits the hose to be quickly and easily connected to the valve hose adapter without the use of expensively produced valve mechanisms or experiencing one or more of the many problems normally associated with the other prior art devices. The same apparatus may also be employed to attach the other end of the drain hose to a sewer fitting connected to a septic tank or some other type of in or above ground sewer system.

SUMMARY OF THE INVENTION

The present invention provides an apparatus for attaching and securing a drain hose to the adapter for an RV waste drain assembly so that the hose can be readily installed on the adapter and, thus, to the assembly. Accordingly, in an exemplary embodiment of the present invention, the apparatus comprises a retaining ring, which may include an annular flange formed along one edge, slidably mountable inside the opening at one end of an RV drain hose. The ring, which can be constructed of either a rigid or flexible material and has a relatively narrow width, acts to retain the shape and requisite diameter dimension of the end section of the hose to facilitate the engagement of the adapter when the two are connected. Before the adapter engages the hose opening, the ring is removed to enable the adapter to easily slip into the hose opening and the hose to then contract around the adapter to form a tight seal between the two components. The ring may also be employed inside the opening at the opposite end of the hose where the hose is attached to a sewer fitting, which is itself connected to a septic tank or some other type of sewer system provided to receive the drained waste matter. In the instance where the hose is connected to the waste drain assembly adapter, the adapter remains attached to the assembly, even after the drainage process is complete. Since the two components are usually stored as a unit, there is no need to reinsert the ring inside the opening. In the other instance, however, since the sewer fitting may not remain permanently affixed to the drain hose, its removal will require the reinsertion of the ring inside that opening to ensure that the opening is maintained at the desired size. In this situation, where it is typical to allow the other end of the drain hose to remain permanently connected to the valve assembly when all the components are stored, problems with leakage of residual waste matter will usually occur. To prevent this leakage, one end of the ring is fashioned like a cap so that it can be closed off entirely. This acts to seal off the end of the hose and contain any leakage that might have otherwise occurred.

Another alternative embodiment of the apparatus of the present invention involves leaving the ring inside the hose opening and inserting the adapter into the hose with the ring still in place. With each of the embodiments described, a complimentary clamping mechanism may be employed to engage the outside surface of the hose near the opening where it is tightened to further secure and seal the connection between the adapter and the hose.

Accordingly, it is an object of the present invention to provide an improved apparatus for attaching an RV drain hose to an adapter connected to a waste drain valve assembly or a sewer fitting connected to a septic tank or some other type of sewer system used for receiving drained waste matter.

It is a further object of the present invention to provide an improved apparatus for attaching an RV drain hose to an adapter used with a waste drain valve assembly or to a sewer fitting, as heretofore described, by utilizing a retaining ring inside the hose opening to maintain the size of the opening to facilitate and secure the connection between the components.

It is another object of the present invention to provide an improved apparatus for attaching an RV drain hose to the adapter used with a waste drain valve assembly which permits the hose to be quickly and easily connected to the adapter by utilizing a retaining ring inside the hose to sufficiently maintain the requisite size of the opening before the connection is made.

It is yet another object of the present invention to provide an improved apparatus for attaching an RV drain hose to the adapter used with a waste drain valve assembly that is simple and economical to manufacture.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
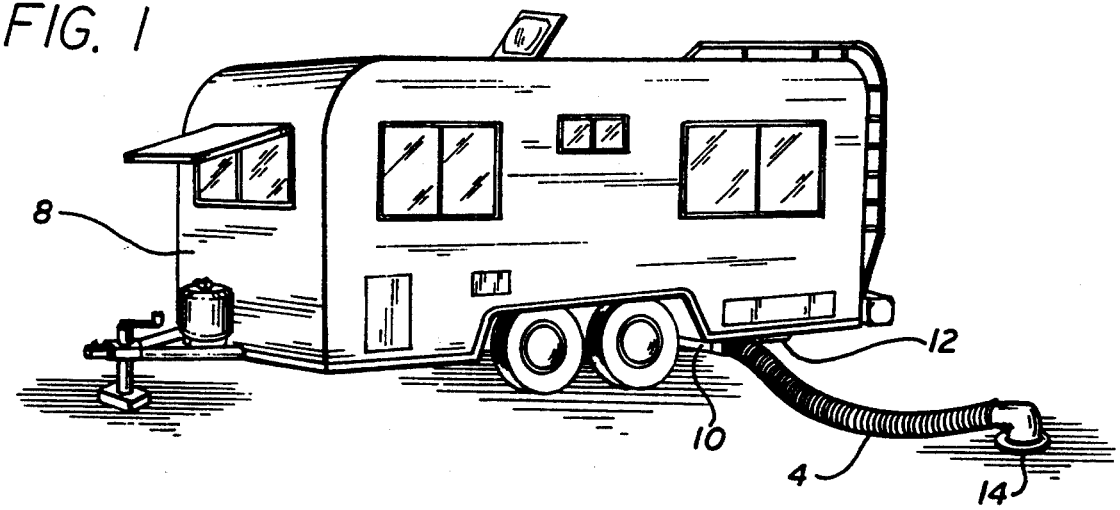
FIG. 1 is a perspective view of a recreational vehicle drain hose connected between a recreational vehicle and a sewer inlet.
Figure 2:
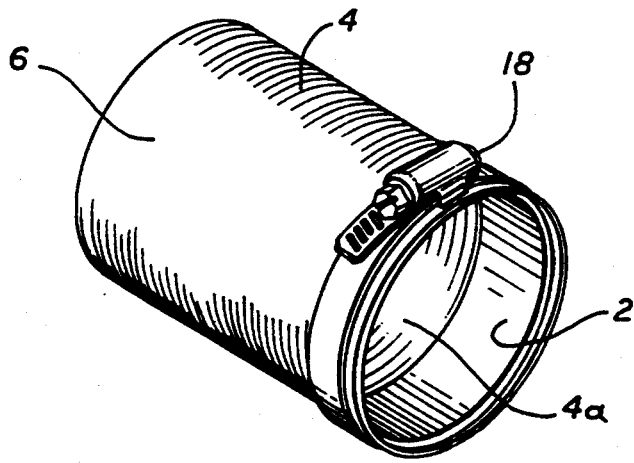
FIG. 2 is an enlarged sectional view of a drain hose with the expansion coupling mechanism of the present invention shown inserted just inside the hose opening.

The present invention relates to an apparatus for connecting a drain hose to the adapter used in conjunction with a waste drain valve assembly utilizing an expansion coupling mechanism to facilitate the connection of the hose to the adapter as illustrated in FIGS. 1--7A-7F. The expansion ring 2, which defines an opening 3, is formed from any suitable flexible or bendable material, such as plastic or rubber, or rigid material, such as, for example, an appropriate synthetic or aluminum, into a cylindrical configuration to conform to the interior diameter of an open ended flexible tubular member or drain hose 4. Drain hose 4 is expandable and constructed in the conventional manner using high tension spring steel wire encased in a vinyl clad covering 6, which gives the hose a coiled appearance. Vinyl material has a tendency to be very pliable and, thus, is easily prone to a certain amount of expansion and contraction.

Figure 5:
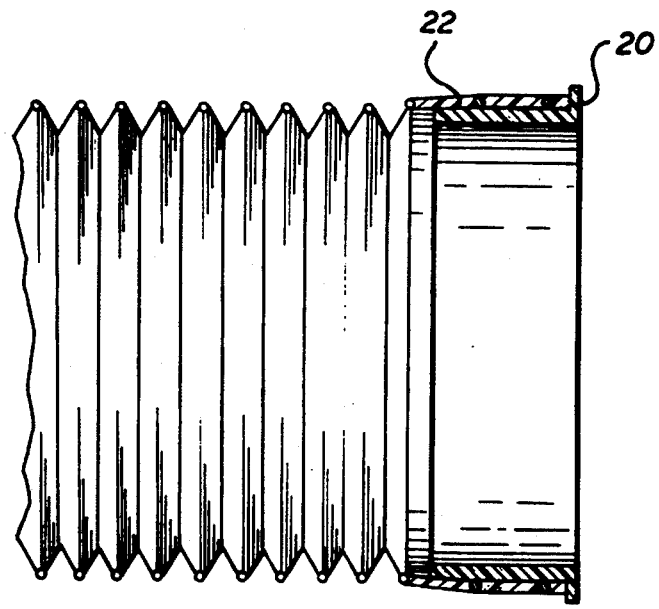
FIG. 5 is an enlarged sectional view of a drain hose with an alternative embodiment of the expansion coupling mechanism of the present invention shown inserted just inside the hose opening.
Figure 6:
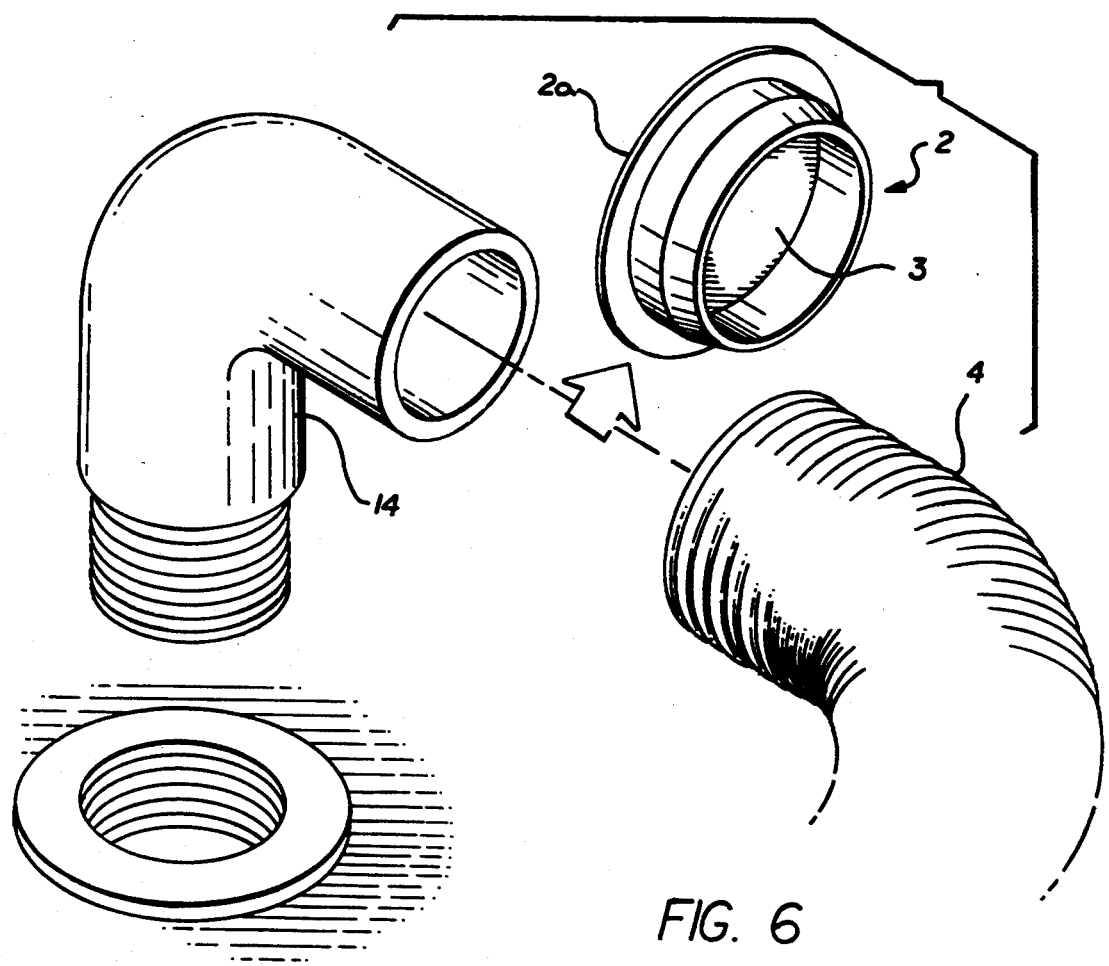
FIG. 6 is a perspective of an alternative embodiment of the present invention showing the end of the drain hose after its disengagement from the fitting at the sewer inlet and depicting the insertion of the capped version of the expansion ring into the hose opening to prevent leakage of residual waste matter.
Figure 7A:
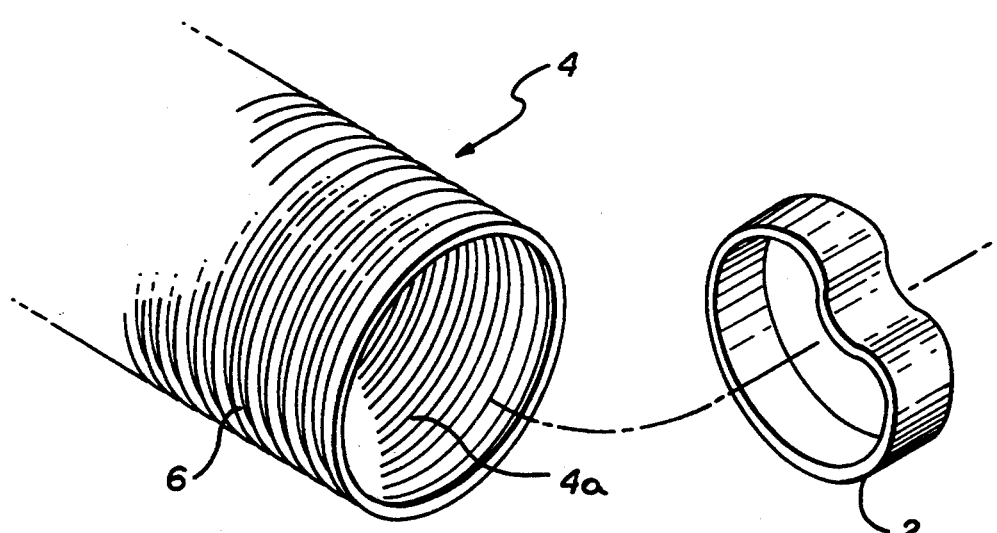
FIG. 7A is a perspective view of the end of a drain hose with the expansion ring slightly compressed and about to be inserted into the end of the hose.
Figure 7B:
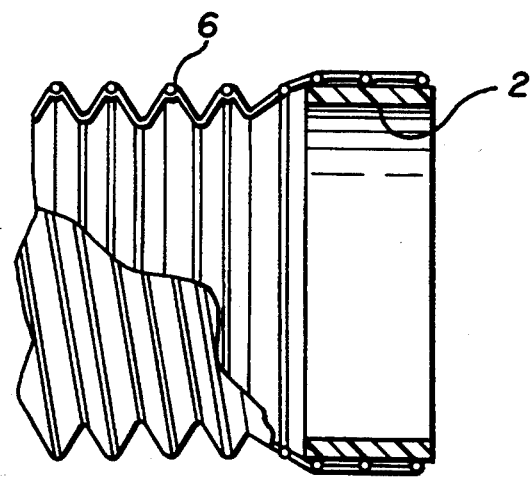
FIG. 7B is a partial sectional view of a drain hose with the expansion ring inserted inside the hose end and expanding its diameter.
Figure 7C:
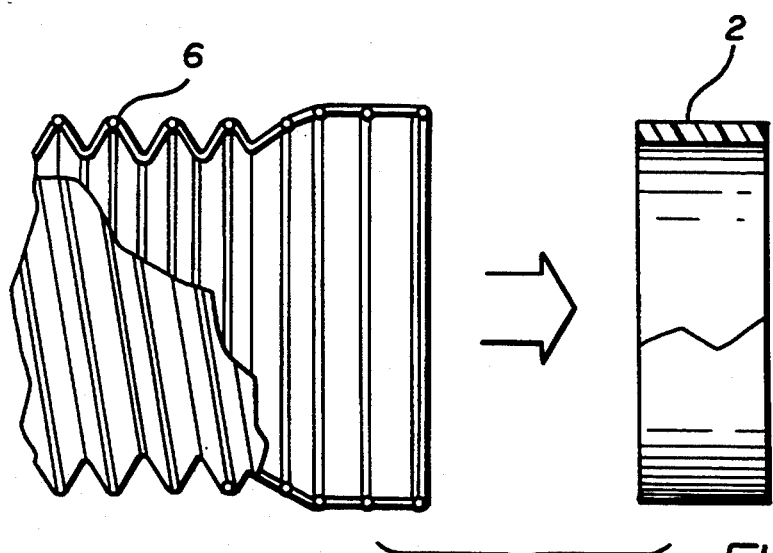
FIG. 7C is a partial sectional view of a drain hose with the expansion ring being removed.
Figure 7D:
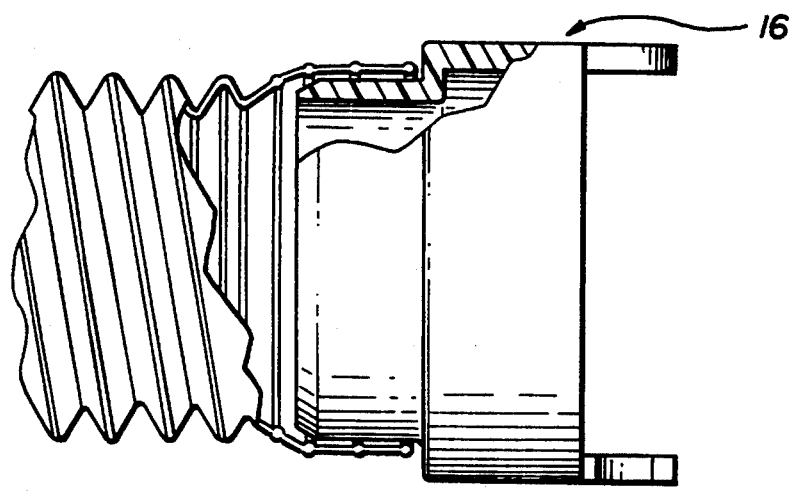
FIG. 7D is a partial sectional view of a drain hose with the valve hose adapter inserted inside the hose end and the walls of the hose shown contracting around it.
Figure 7E:
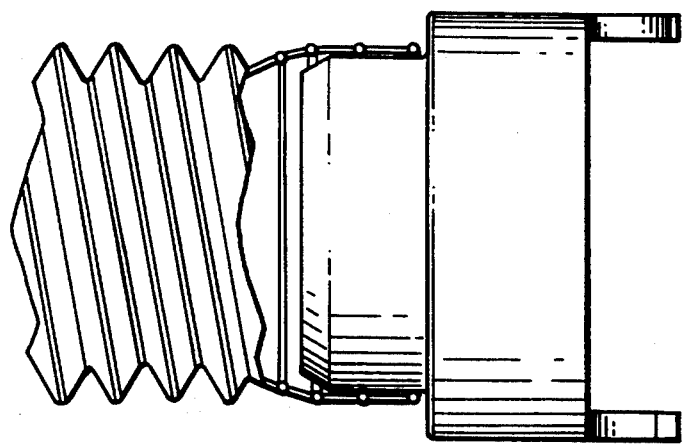
FIG. 7E is a partial sectional view of a drain hose with the valve hose adapter inserted inside the contracted hose end.
Figure 7F:
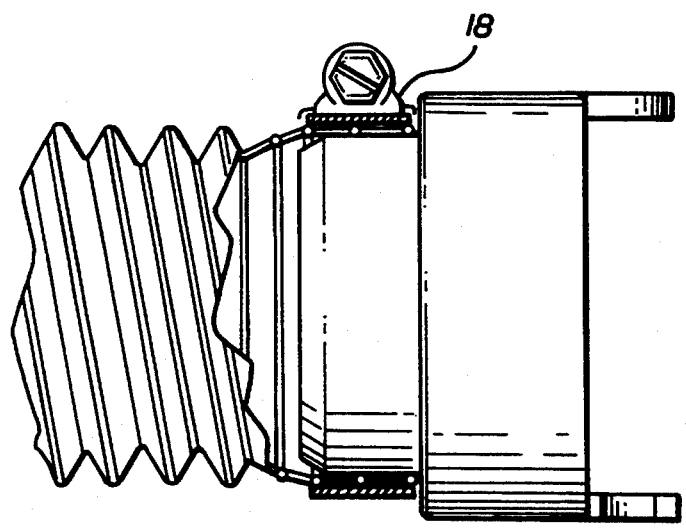
FIG. 7F is a partial sectional view of a drain hose with the valve hose adapter inside the contracted hose end and a hose clamp engaging the exterior hose wall.

In a typical application of the apparatus present invention, a recreational vehicle 8 having a waste drain valve assembly 10 connected to its underbody 12 will drive into a campground or some similar facility where its drain hose 4 is connected to an underground sewer inlet fixture or fitting 14. It is most common for an adapter 16 to be used in conjunction with the waste drain valve assembly 10 to facilitate the connection of the assembly to the drain hose 4. Conventional non-threaded adapters, such as adapter 16, will usually have a diameter that is slightly larger than the diameter of the opening 4a located at the end of the drain hose 4. This is to ensure an extremely tight fit and secure seal between the two to preclude against waste leakage and the possibility of breaking the connection between the hose and the adapter. However, the contracted condition of the vinyl clad covering at the hose end around opening 4a will make it difficult to connect the two components due to the cumbersome and often-frustrating task of having to stretch the material to form an opening sufficiently large enough to accommodate the adapter. Thus, the expansion ring 2, in its bendable and more resilient embodiment, is initially deformed and slightly compressed to condense its size and reduce its outer diameter enabling it to be more easily insertable into the opening 4a. There it can be manipulated and then allowed to expand and revert to its original cylindrical configuration. Alternatively, the rigid version of the expansion ring 2 is insertable inside the opening 4a where it remains to ensure the appropriate size of the opening and, as with its more pliable counterpart, prevent the opening from contracting. The rigid embodiment of the retaining ring 2 may also incorporate an annular flange 20 integrally formed along the edge of either side of the ring 2. The purpose of flange 20 is to ensure that ring 2 will remain centered and stable inside the hose opening 4a once it is inserted. Also, to facilitate the engagement of the ring 2 with the opening 4a, either edge of the ring may be tapered, as shown in FIG. 5. The tapered edge 22 will assist in minimizing, if not totally eliminating, the need to deform either embodiment of the ring 2 in the process of inserting it into the opening 4a.

Figure 3:
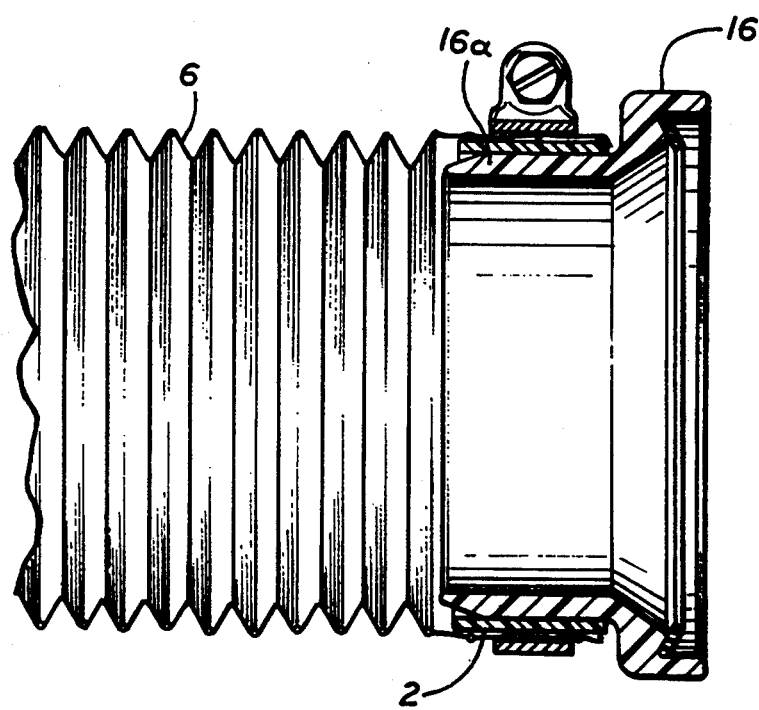
FIG. 3 is a partial sectional view of a drain hose containing the coupling mechanism just inside the hose opening and engaging a waste valve drain assembly adapter.
Figure 4:
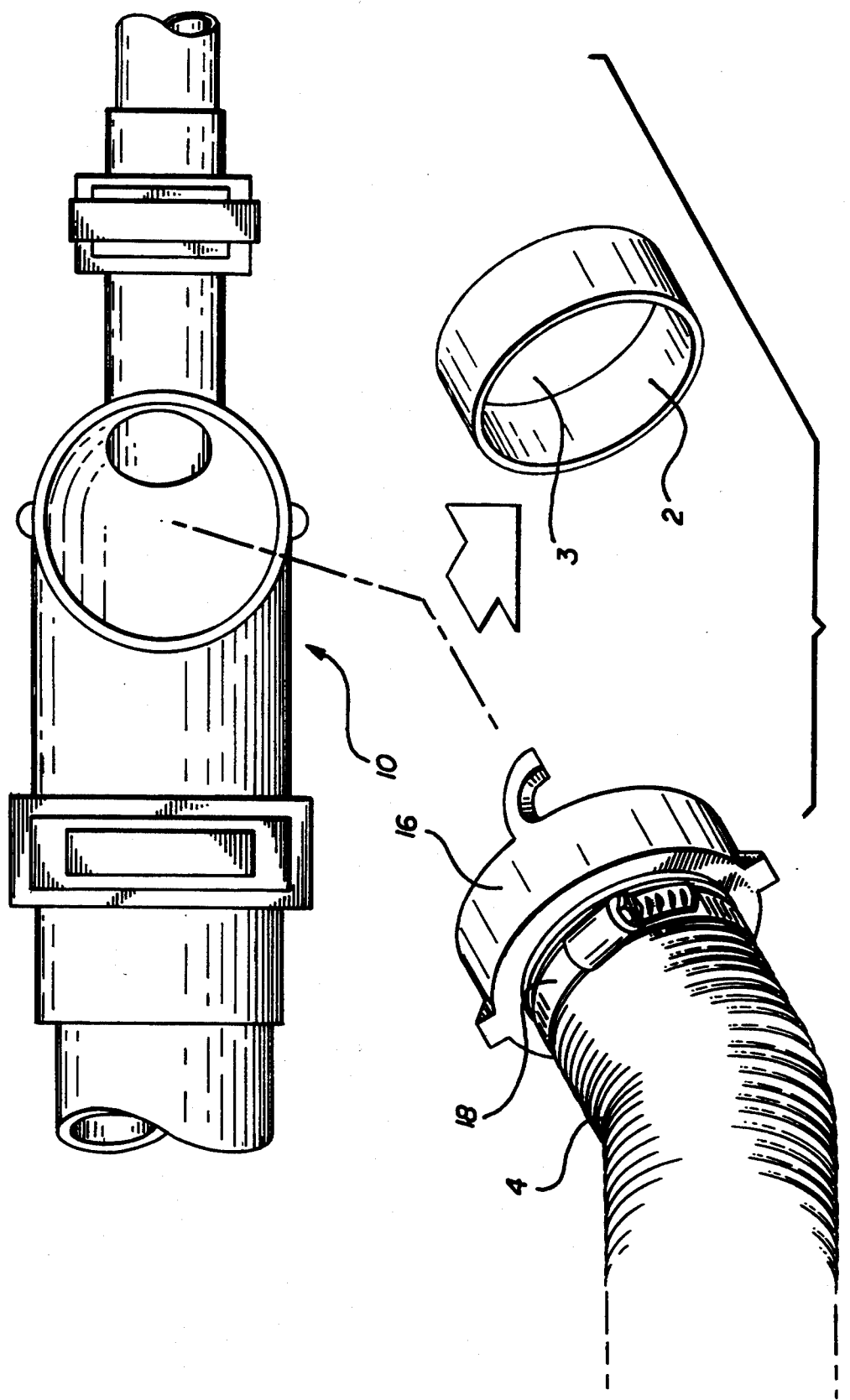
FIG. 4 is a perspective view of the waste drain valve assembly and a partial sectional view of a drain hose depicting the sequence of steps involved in attaching the hose to the adapter after the removal of the expansion coupling mechanism.

In a typical application of the present invention, immediately prior to attaching the hose 4 to the adapter 16, the ring 2 is removed. The male end 16a of the adapter 16 is then inserted into the hose opening 4a, which then contracts around the adapter 16 and seals the coupling. A conventional hose clamping mechanism 18 may then be placed over the outer surface 5 of the hose 4 and tightened to provide additional security to the connection to further ensure against leakage and preclude the two parts from separating. After the waste is drained from the recreational vehicle, the adapter 16 remains connected to the hose 4 and the two components are then stored away in this manner, as one unit. FIG. 3 illustrates an alternative embodiment of the present invention wherein the adapter 16 engages the drain hose 4 with the expansion ring 2 still inside the opening 4a.

Finally, the ring 2 may also be employed at the opposite end of the hose 4 where the hose is connected to the sewer fitting 14. Here, though, once the drainage process is complete, the fitting 14 and the hose 4 must be separated. When the fitting 14 and the hose 4 disengage, the expansion ring 2 is again inserted inside the hose opening to prevent it from contracting and to ensure the facilitation of the connection when the hose and that or another sewer fitting are re-engaged. Alternatively, the ring 2 will include a cap 2a for sealing off one side of the opening 3. This prevents any leakage of residual waste matter from escaping out the end of the hose when the entire assemblage of components still attached to the waste drain assembly is stored.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

I claim:

1. A coupling between a length of flexible tubing, said tubing being radially expansible and contractible and having a contracted position and an expanded position and an interior tubing wall with an interior diameter and an exterior tubing wall with an exterior diameter defining openings at opposite ends of the tubing, and a waste drain valve assembly employing a valve hose adapter with a male coupler comprising a compressible retaining ring slidably insertable into either of said openings whereby said retaining ring expands against the interior tubing wall to maintain the exterior diameter of the tubing in its expanded position, said male coupler being slidably insertable into said opening in sealing engagement with said retaining ring.

2. The invention of claim 1 wherein the retaining ring includes a first edge and a second edge and an annular flange integrally formed with said first edge.

3. The invention of claim 2 wherein said retaining ring includes a tapered portion along said second edge for engaging either of said openings and facilitating the entry of said retaining ring into said openings.

* * * * *